(12) United States Patent
Yoshikawa (10) Patent No.: US 8,656,172 B2
(45) Date of Patent: Feb. 18, 2014

(54) MULTIMEDIA PROCESSING APPARATUS (75) Inventor: Hisashi Yoshikawa, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 46 days.

(21) Appl. No.: 13/422,052

(22) Filed: Mar. 16, 2012

(65) Prior Publication Data

US 2012/0331291 A1 Dec. 27, 2012

(30) Foreign Application Priority Data

Jun. 21, 2011 (JP) ................................. 2011-137574

(51) Int. Cl.
H04L 29/06 (2006.01)
(52) U.S. Cl.
USPC ........................................................ 713/173
(58) Field of Classification Search
USPC .......... 713/169, 173, 158, 192; 380/227, 229, 380/231, 232
See application file for complete search history.

(56) References Cited

U.S. PATENT DOCUMENTS

| 2005/0210241 A1* | 9/2005 | Lee et al. ....................... 713/158 |
| 2010/0145480 A1 | 6/2010 | Yoshikawa |
| 2011/0047255 A1 | 2/2011 | Yoshikawa |

FOREIGN PATENT DOCUMENTS

JP 2011-039981 2/2011

* cited by examiner

Primary Examiner — Edward Zee
(74) Attorney, Agent, or Firm — Sprinkle IP Law Group

(57) ABSTRACT

According to one embodiment, a multimedia processing apparatus includes one or more first module, a second module, and a third module. The first module is configured to realize a function involved with a multimedia processing. The second module is configured to manage the first module. The third module is configured to control the first module or to perform a state transition of the first module through the second module. One of two modules out of the first to third modules holds a certificate that provides its personal identification. When a first processing is executed between the two modules, the other one of the two modules authenticates the one module by using the certificate held by the one module, and then, the two modules start the first processing.

19 Claims, 4 Drawing Sheets

MULTIMEDIA PROCESSING APPARATUS

CROSS-REFERENCE TO RELATED APPLICATIONS

This application is based upon and claims the benefit of priority from Japanese Patent Application No. 2011-137574, filed on Jun. 21, 2011; the entire contents of which are incorporated herein by reference.

FIELD

Embodiments described herein relate generally to a multimedia processing apparatus.

BACKGROUND

In a field of an image processing technique, for example, there has conventionally been known a multimedia processing apparatus that realizes a desired function by utilizing plural function blocks. For example, OpenMAX defines each of plural function blocks, which realizes a recording or playing of a moving image, as a component. The components involved with the multimedia processing include various components, such as the one for decoding a moving-image file, the one for executing a filtering process, and the one for executing a rendering process. Each component has a port for data communication. The ports for the data communication are set to connect between the components, whereby data is transferred via the ports between the components. Thus, the multimedia processing apparatus can execute a process of playing a moving image by utilizing plural components.

As described above, each function is realized as a component according to the OpenMAX, whereby the components can be connected with each other as desired in accordance with a predetermined interface standard. The component can easily be mounted, arranged, and reused. Therefore, a load can be reduced by the design in accordance with the standard, compared to the case where all functions are designed from the beginning.

DETAILED DESCRIPTION

In general, according to embodiments, a multimedia processing apparatus includes one or more first module, a second module, and a third module. The first module is configured to realize a function involved with a multimedia processing. The second module is configured to manage the first module. The third module is configured to control the first module or to perform a state transition of the first module through the second module. One of two modules out of the first to third modules holds a certificate that provides its personal identification. When a first processing is executed between the two modules, the other one of the two modules authenticates the one module by using the certificate held by the one module, and then, the two modules start the first processing.

Exemplary embodiments of a multimedia processing apparatus will be explained below in detail with reference to the accompanying drawings. The present invention is not limited to the following embodiments.

When a copyright protection content is recorded and played, an encryption and decoding are executed by using an encrypted key. In this case, it is necessary to limit a function module that handles secret data such as a key, and to validate the function module, from the viewpoint of keeping confidentiality. On the other hand, a standardized system such as OpenMAX is characterized in that some components forming the system can easily be replaced.

The standardized multimedia system, having a high treat of incorrect replacement, masquerading, and falsification of the function module handling the secret data such as a key, has a problem that the the function module cannot be validated.

In view of this, the embodiments according to the present invention provide a configuration of making authentication between components, thereby enhancing confidentiality of a multimedia processing apparatus. The multimedia processing apparatus according to the embodiments will be described in detail below with reference to the attached drawings. The present invention is not limited by these embodiments.

Figure 1:
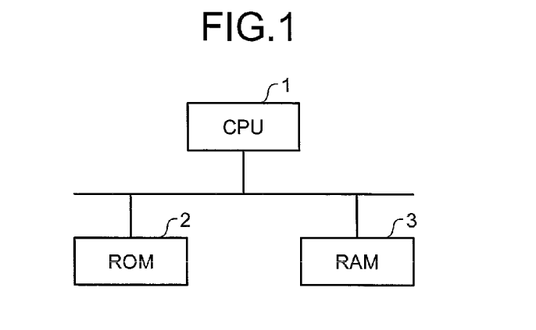
FIG. 1 is a diagram illustrating one example of a hardware structure of a multimedia processing apparatus according to a first embodiment.

FIG. 1 is a diagram for describing an example of a hardware structure of a multimedia processing apparatus according to a first embodiment.

As illustrated in FIG. 1, the multimedia processing apparatus has a configuration equivalent to that of a general computer. Specifically, the multimedia processing apparatus includes a CPU (Central Processing Unit) 1, ROM (Read Only Memory) 2, and RAM (Random Access Memory) 3, those of which are connected to a bus.

The ROM 2 stores a client program, a core program, and one or more component programs. The CPU 1 reads these programs from the ROM 2, and develops and executes the same on the RAM 3. When the CPU 1 executes the client program, the core program, and the component programs, a client module, a core module, and a component, which are described later, are constructed.

Each of one or more component programs is, for example, a program executing a single function such as a video decoding process or filtering process. The single-function processes are combined to execute a final data processing, e.g., to record or play a moving image, and the result of the processing is displayed onto a display device not illustrated.

Figure 2:
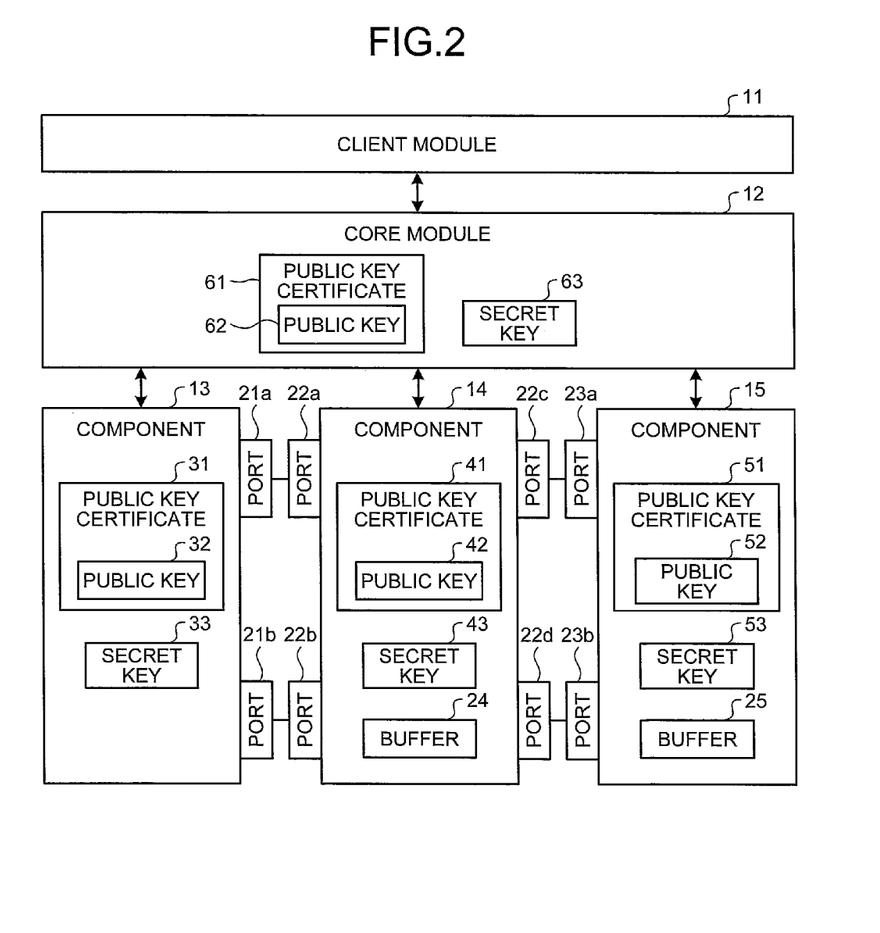
FIG. 2 is a diagram for describing a functional configuration of the multimedia processing apparatus according to the first embodiment.

FIG. 2 is a diagram for describing a functional configuration of the multimedia processing apparatus according to the first embodiment, wherein the functional configuration can be realized by the execution of the client program, the core program, and the component programs by the CPU 1.

As illustrated in FIG. 2, the multimedia processing apparatus includes a client module 11, a core module 12, and plural, here, three components 13 to 15.

FIG. 2 illustrates the multimedia processing apparatus, when a playing process of a moving image is instructed. For example, the component 13 is a functional block executing a video decoding process, the component 14 is a functional block executing a filtering process, and the component 15 is a functional block executing an output process onto a screen. Specifically, each of the components 13 to 15 realizes a single function involved with the multimedia processing. The multimedia processing apparatus plays a moving image by combining these components 13 to 15. The multimedia processing apparatus may have plural components, not illustrated, in addition to three components 13 to 15. When the playing process of a moving image is instructed, the multimedia processing apparatus plays the moving image by combining these plural components.

The client module 11 issues, to the core module 12, a request involved with the control of the components 13 to 15, e.g., a request involved with a creation of an instance of the components 13 to 15 or a tunnel connection in the component 13. The client module 11 also issues, to the core module 12, a request involved with a state transition of the components 13 to 15. The state transition of the components 13 to 15 includes an execution state transition in which the state is changed from a state where the playing of the moving image is stopped to a state where the playing is executed; an idle state transition in which the state is changed from a state where the playing of the moving image is executed to a state where the playing is stopped; a port valid state transition for making a port (described later) valid; and a port invalid state transition for invalidating the port. The request involved with the state transition is transferred to the target component via the core module 12.

The core module 12 manages the components 13 to 15 provided to the multimedia processing apparatus. The core module 12 issues and processes a command to the components 13 to 15 based upon the request from the client module 11. Specifically, the client module 11 can control the component 13 or can execute the state transition of the component 13 through the core module 12. For example, when receiving the request of creating an instance, the core module 12 specifies the target component out of the components 13 to 15 managed by the core module 12, and creates the instance of the specified component.

The components 13 to 15 transmit and receive data among the components 13 to 15 for executing the playing process of the moving image. Therefore, the components 13 to 15 have ports for transmitting and receiving data.

As illustrated in FIG. 2, the component 13 has two ports 21a and 21b. The component 14 has four ports 22a to 22d. The component 15 has two ports 23a and 23b. The ports 21a to 21b of the component 13 are connected to the ports of the other component 14 or 15, whereby the data transfer among the ports is realized.

In FIG. 2, the ports 21a and 21b of the component 13 are connected to the ports 22a and 22b of the component 14. The multimedia processing apparatus makes a data transfer between the component 13 and the component 14 by using the ports 21a and 22a or the ports 21b and 22b. Similarly, the ports 22c and 22d of the component 14 are connected to the ports 23a and 23b of the component 15. The multimedia processing apparatus makes a data transfer between the component 14 and the component 15 by using the ports 22c and 23a or the ports 22d and 23b.

The components 14 and 15 have buffers 24 and 25 respectively. The components 13 to 15 can share data by using the buffers 24 and 25 through the connection of the ports described above. In FIG. 2, the data in the buffer 24 is shared by the components 13 and 14. Similarly, the data in the buffer 25 is shared by the components 14 and 15.

The component 13 includes a public key 32 used for a communication session of a public key cryptosystem, and a secret key 33 that makes a pair with the public key 32. The public key 32 is stored in a public key certificate 31 certifying that the public key 32 belongs to the component 12. Similarly, the component 14 has a public key 42 and a secret key 43 that makes a pair with the public key 42. The public key 42 is stored in a public key certificate 41 certifying that the public key 42 belongs to the component 14. Similarly, the component 15 has a public key 52 and a secret key 53 that makes a pair with the public key 52. The public key 52 is stored in a public key certificate 51 certifying that the public key 52 belongs to the component 15. Similarly, the core module 12 has a public key 62 and ak secret key 63 that makes a pair with the public key 62. The public key 62 is stored in a public key certificate 61 certifying that the public key 62 belongs to the core module 12.

Figure 3:
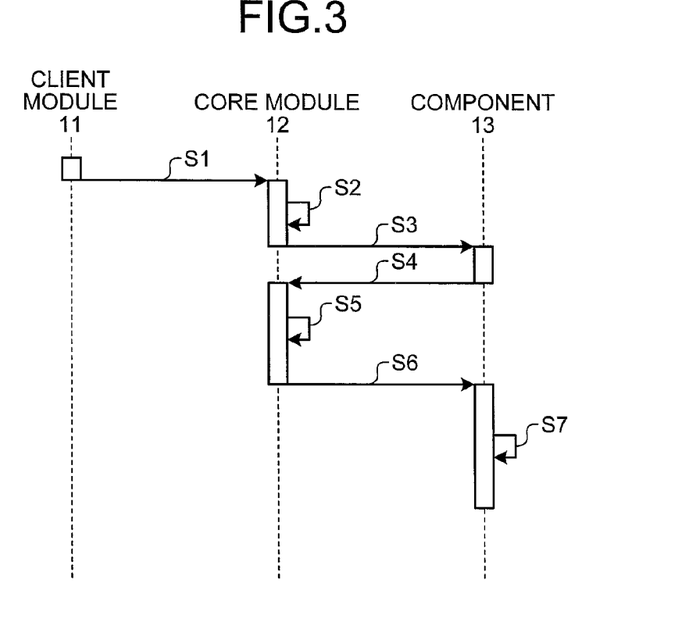
FIG. 3 is a sequence diagram for describing an operation of the multimedia processing apparatus according to the first embodiment.

An operation of the multimedia processing apparatus thus configured according to the first embodiment of the present invention will next be described. FIG. 3 is a sequence view illustrating the operation of the multimedia processing apparatus according to the first embodiment.

As illustrated in FIG. 3, the client module 11 firstly issues a request of creating an instance of the component 13 to the core module 12 (step S1). The core module 12 receiving the request of creating the instance searches whether or not there is the corresponding component 13 in the components 13 to 15 under the control of the core module 12 (step S2). Since the component 13 is under the control of the core module 12, the core module 12 specifies the component 13, and issues a certificate transmission request of transmitting a public key certificate to the specified component 13 (step S3).

When receiving the certificate transmission request from the core module 12, the component 13 transmits the public key certificate 31 retained by the component 13 to the core module 12 (step S4). When receiving the public key certificate 31 from the component 13, the core module 12 validates the received public key certificate 31 (step S5). When succeeding in validating the public key certificate 31, the core module 12 creates the instance of the component 13 (step S6), and the component 13 executes an initialization process for creating its instance (step S7). When failing in validating the public key certificate 31 in step S5, the core module 12 does not start the creation of the instance, but reports an error to the client module 11.

According to the first embodiment of the present invention, the core module 12 authenticates the component 13, when creating the instance of the component 13. This process can prevent incorrect replacement, masquerading, and falsification of the component 13, which can enhance confidentiality of the multimedia processing apparatus. For example, when the component 13 is a function block for decoding an encrypted copyright content, the first embodiment of the present invention can prevent the replacement and falsification of the function block, thereby being capable of preventing the copyright content from being illegally copied and from being illegally viewed.

In the above description, the core module 12 is described as making authentication upon creating the instance of the component 13. However, the core module 12 may authenticate the components 14 and 15 upon creating the instances of the components 14 and 15, respectively.

In the above description, the core module 12 makes authentication upon creating an instance. However, the timing of the authentication is not limited to the timing of creating the instance. For example, the authentication may be made when the component 13 creates a descriptor of the component 13. Alternatively, the authentication may be made when the component 13 secures a system resource. The authentication may also be made upon the state transition of the component 13. The core module 12 may make authentication using a certificate revocation list. Specifically, the core module 12 retains the certificate revocation list beforehand. When the core module 12 succeeds in validating the public key certificate 31 held by the component 13, and this public key certificate 31 is not written on the certificate revocation list, the core module 12 determines that the authentication is successful. On the other hand, when the core module 12 fails in validating the public key certificate 31 held by the component 13, or when the public key certificate 31 is written on the certificate revocation list, the core module 12 determines that the authentication is unsuccessful.

In the above description, only the operation of the authentication has been described. When the process, which makes a pair with the process serving as a trigger of the validation, for changing the operation to the state before the process is executed, the core module 12 may discard the authentication. For example, when the instance is destroyed, the core module 12 may discard the authentication, which is made upon creating the instance. When the descriptor is destroyed, the core module may also discard the authentication, which is made upon creating the descriptor. The core module may also discard the authentication, which is made upon securing a system resource, when the system resource is released. The core module 12 may also discard the authentication, which is made upon performing the state transition, when the state is changed, due to another state transition, to the state before the state transition is executed. When the process that makes a pair with the process serving as a trigger for the authentication is executed, the corresponding authentication is discarded, whereby the period during when the authentication, which has once made, is valid can be shortened. Accordingly, the confidentiality can be enhanced more.

The client module 11 may hold the public key buried in the certificate, and the secret key that makes pair with the public key, and the components 13 to 15 may authenticate the client module 11 upon creating the instance of the components 13 to 15, upon creating the descriptor, upon securing the system resource, or upon executing the state transition. The components 13 to 15 may authenticate the client module 11 not only in the above-mentioned cases, but also in the case where the components 13 to 15 are connected to the client module 11 in a non-tunneled manner. The components 13 to 15 may also authenticate the client module 11 in order to make the non-tunneled ports valid.

A second embodiment of the present invention will next be described. The configuration of a multimedia processing apparatus in the second embodiment is the same as that of the apparatus in the first embodiment. Since the configuration has already been described above, the description for the configuration will not be repeated.

Figure 4:
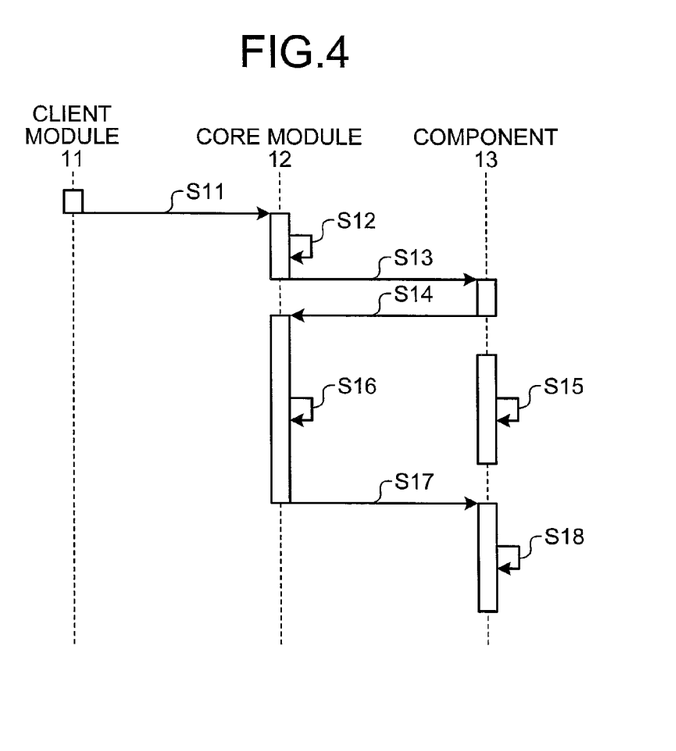
FIG. 4 is a sequence diagram for describing an operation of a multimedia processing apparatus according to a second embodiment.

FIG. 4 is a sequence diagram for describing an operation of the multimedia processing apparatus according to the second embodiment. The client module 11 firstly issues a request of creating an instance of the component 13 to the core module 12 (step S11). The core module 12 receiving the request of creating the instance searches whether or not there is the corresponding component 13 in the components 13 to 15 under the control of the core module 12 (step S12). Since the component 13 is under the control of the core module 12, the core module 12 specifies the component 13, and then, the core module 12 issues a certificate transmission request of transmitting a public key certificate, and transmits a public key certificate 61 held by the core module 12 to the specified component 13 (step S13).

When receiving the public key certificate 61 and the certificate transmission request from the core module 12, the component 13 transmits the public key certificate 31 retained by the component 13 to the core module 12 (step S14). The component 13 also validates the received public key certificate 61 of the core module 12 (step S15).

The core module 12 validates the public key certificate 31 received from the component 13, simultaneous with the process in step S15 (step S16). When succeeding in validating the public key certificate 31, the core module 12 creates the instance of the component 13 (step S17). When failing in validating the public key certificate 31, the core module 12 does not execute the process in step S17, but reports an error to the client module 11.

When succeeding in validating the public key certificate 61 received from the core module 12, the component 13 executes an initialization process involved with the creation of the instance after the process in step S17 (step S18). When failing in validating the public key certificate 61, the component 13 does not execute the process in step S18, but reports an error to the client module 11.

As described above, two-way authentication is established between the core module 12 and the component 13 according to the second embodiment. This structure can prevent not only the replacement or falsification of the component 13 but also the replacement or falsification of the core module 12, resulting in that the confidentiality can be enhanced more.

According to the second embodiment, after the authentication and key exchange are completed, the communication can be established between the core module 12 and the component 13 with a communication session of a public key cryptosystem. Therefore, the communication between the core module 12 and the component 13 can be kept confidential, with the result that the confidentiality can be enhanced more.

The timing of the authentication in the second embodiment is not limited to the timing of creating the instance, as in the first embodiment. When the process, which makes a pair with the process serving as a trigger of the validation, is executed, the authentication may be discarded. The core module 12 may establish two-way authentication not only with the component 13, but also with the components 14 and 15. The two-way authentication is established between the core module 12 and each of the components 13 to 15.

When the process, which makes a pair with the process serving as a trigger of the two-way authentication, is executed, the core module 12 and the component 13 may discard the authentication respectively. Either one or both of the core module 12 and the component 13 may make authentication using the certificate revocation list.

A third embodiment of the present invention will next be described. The configuration of a multimedia processing apparatus in the third embodiment is the same as that of the apparatus in the first embodiment. Since the configuration has already been described above, the description for the configuration will not be repeated.

Figure 5:
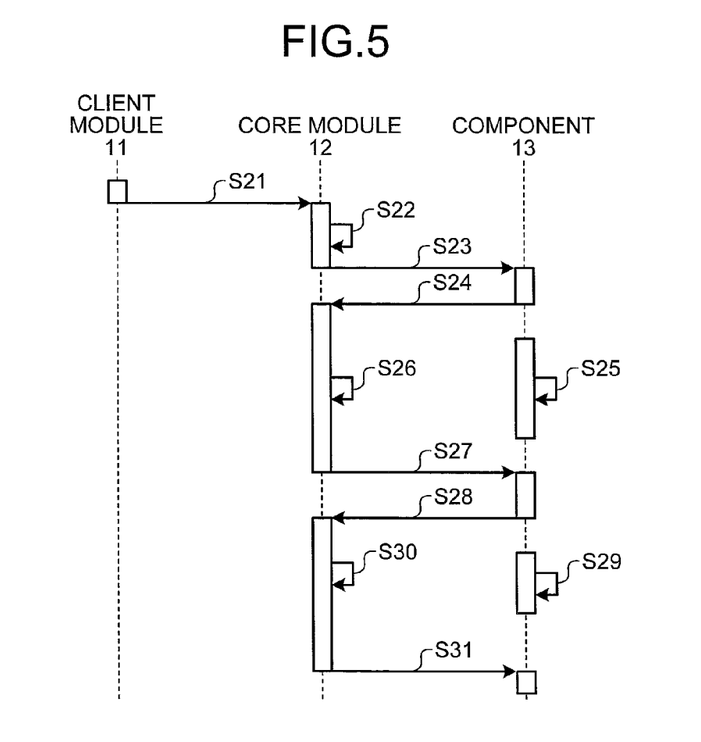
FIG. 5 is a sequence diagram for describing an operation of a multimedia processing apparatus according to a third embodiment.

FIG. 5 is a sequence diagram for describing an operation of the multimedia processing apparatus according to the third embodiment. As illustrated in FIG. 5, the processes same as those in steps S11 to S16 are respectively executed in steps S21 to S26.

When the core module 12 succeeds in validating the public key certificate 31 in the process in step S26, and the component 13 succeeds in validating the public key certificate 61 in the process in step S25, the core module 12 uses the public key 62 and the secret key 63, and the component 13 uses the public key 32 and the secret key 33. With this, a secure communication is established between the core module 12 and the component 13. In the secure session using the public key and the secret key, the core module 12 creates a seed of a common key, signs into the created seed (seed 72) by use of the secret key 63, and transmits the signed seed (seed 71) to the component 13 (step S27). When receiving the seed 71, the component 13 personally creates a seed (seed 82), signs into the created seed 82 by use of the secret key 33, and transmits the signed seed (seed 81) to the core module 12 (step S28).

Figure 6A:
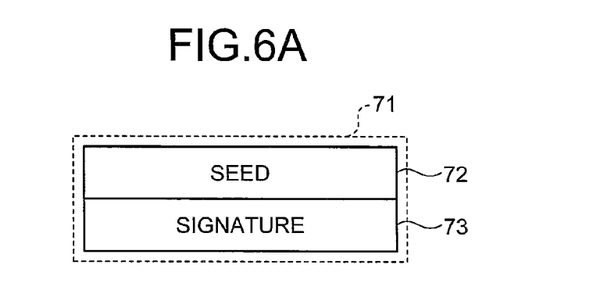
FIG. 6A is a view illustrating a data structure of a common key generating seed transmitted to a component from a core module.
Figure 6B:
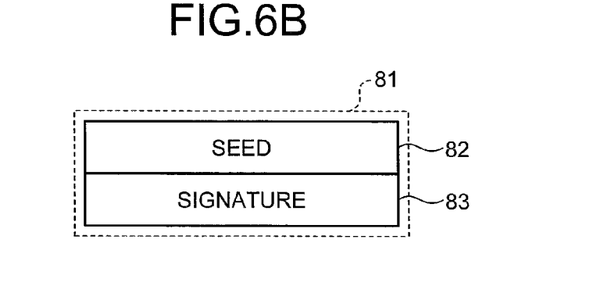
FIG. 6B is a view illustrating a data structure of a common key generating seed transmitted to a component from a core module.

FIG. 6A is a view illustrating a data structure of the seed 71 transmitted to the component 13 by the core module 12, while FIG. 6B is a view illustrating a data structure of the seed 81 transmitted to the core module by the component 13. As illustrated in the figures, the seed 71 has the data structure formed by adding a signature 73 to the seed 72 created by the core module 12. The seed 81 has a data structure formed by adding a signature 83 to the seed 82 crated by the component 13.

The component 13 validates the signature 73 included in the seed 71 received from the core module 12 so as to acquire the seed 72. The component 13 then creates the common key by using the seed 72 and the seed 82 created by the component 13 (step S29). The core module 12 validates the signature 83 included in the seed 81 received from the component 13 so as to acquire the seed 82. The core module 12 then creates the common key by using the seed 82 and the seed 72 created by the core module 12 (step S30). When the component 13 and the core module 12 fail in validating the signature included in the received seed, they may report an error to the client module 11 without creating the common key.

After the processes in steps S29 and S30, the secure communication can be established between the component 13 and the core module 12 by use of the shared common key. The core module 12 creates the instance in the secure session using the common key (step S31). Thereafter, the component 13 makes an initialization process involved with the creation of the instance. The data transfer and control executed afterward between the component 13 and the core module 12 are transferred with encrypted communication utilizing the common key, whereby they can be realized with confidentiality.

The common key creation described above is only illustrative, and the system of the common key exchange using the communication session with the public key cryptosystem is not limited to the above-mentioned system.

According to the third embodiment, the component 13 and the core module 12 share the common key by using the communication session with the public key cryptosystem, and they make communication with the communication session using the common key cryptosystem by use of the shared common key. Accordingly, a processing load is reduced, compared to the communication using the communication session with the public key cryptosystem, resulting in that the operation of the multimedia processing apparatus can be made faster.

The timing of the authentication in the third embodiment is not limited to the timing of creating the instance, as in the first embodiment. When the process, which makes a pair with the process serving as a trigger of the authentication, is executed, the authentication may be discarded. The core module 12 may naturally establish authentication and key exchange not only with the component 13, but also with the components 14 and 15.

In the first to third embodiments, the authentication is made between the core module 12 and the components 13 to 15. However, it is not limited that the authentication is made between the core module 12 and the components 13 to 15. In a fourth embodiment, the authentication is made between the components.

The configuration of a multimedia processing apparatus in the fourth embodiment is the same as that of the apparatus in the first embodiment. Since the configuration has already been described above, the description for the configuration will not be repeated.

Figure 7:
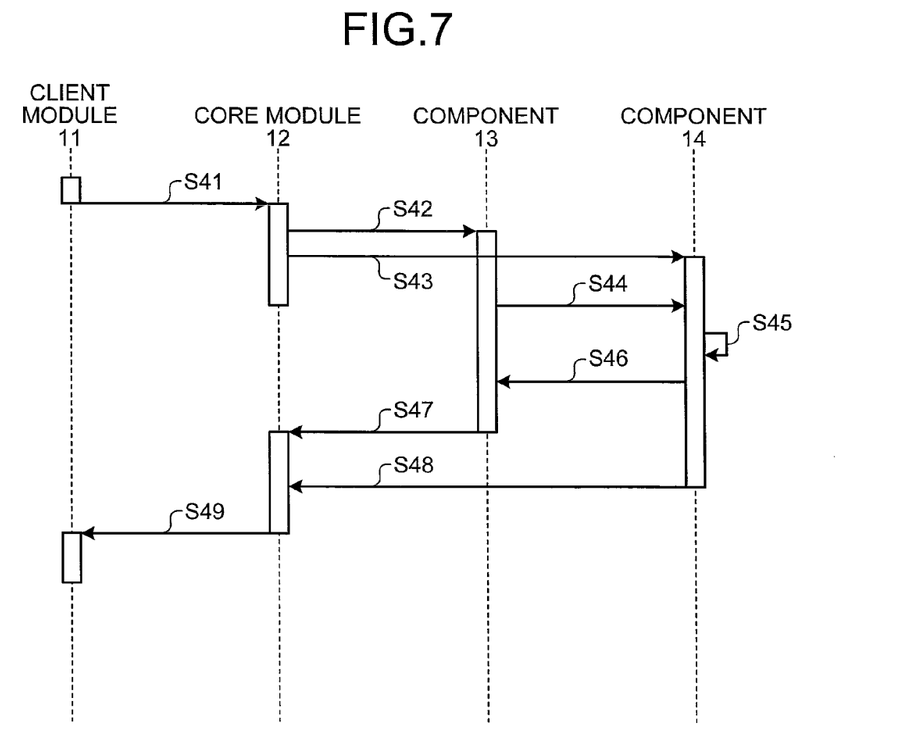
FIG. 7 is a sequence diagram for describing an operation of a multimedia processing apparatus according to a fourth embodiment.

FIG. 7 is a sequence diagram for describing an operation of the multimedia processing apparatus according to the fourth embodiment. As illustrated in FIG. 7, the client module 11 transmits to the core module 12 a request of tunnel connection between the component 13 and the component 14 (step S41). The core module 12 receiving this request transmits a request of a tunneled connection with the component 14 to the component 13 (step S42), and transmits a request of a tunneled connection with the component 13 to the component 14 (step S43).

When receiving the request of the tunneled connection with the component 14, the component 13 transmits the request of the tunneled connection to the component 14 together with the public key certificate 31 held by the component 13 (step S44). When receiving the requests from the core module 12 and the component 13, the component 14 validates the public key certificate 31 received from the core module 12 together with the request (step S45). When succeeding in validating the public key certificate 31, the component 14 executes a tunneled connection process between the component 14 and the component 13 (step S46). When failing in validating the public key certificate 31 in step S45, the component 14 reports an error to the client module 11 without executing the tunneled connection process between the component 14 and the component 13.

After the tunneled connection process is completed, the component 13 and the component 14 respectively transmit a message, indicating that the tunneled connection is completed, to the core module 12 (step S47, step S48). When receiving the message, indicating that the tunneled connection process is completed, from the component 13 and the component 14, the core module 12 transmits a message, indicating that the tunneled connection is completed, to the client module 11 (step S49).

According to the fourth embodiment, the component 14 authenticates the component 13 as described above. This structure can prevent the replacement or falsification of the component 13, resulting in that the confidentiality can be enhanced more.

In the above description, the component 14 authenticates the component 13. However, the component 13 may authenticate the component 14. It may also be configured that two-way authentication is established between the components 13 and 14 or between the components 14 and 15. As in the third embodiment between the core module 12 and the component 13, the two-way authentication is made between the components 13 and 14, and then, the communication between the components 13 and 14 is made by using the communication session of the public key cryptosystem. Alternatively, the two-way authentication may be made between the components 13 and 14, and then, they may share a common key by using the communication session of the public key cryptosystem. They may make communication afterward by using the communication session of the common key cryptosystem.

The timing of making authentication between the components 13 and 14 is not limited to the timing of executing the tunneled connection between the components 13 and 14. For example, in the tunneled connection, the authentication may be made when the tunneled port is validated. The authentication may be made, when either one of the components 13 and 14 performs the state transition. The authentication may also be made, when the first communication is established between the components 13 and 14 by using the buffer 24.

As in the first embodiment, when the process, which makes a pair with the process serving as a trigger of the validation, is executed, the authentication may be discarded. For example, the authentication, which has been made for the tunneled connection, may be discarded when the tunneled connection is cut. The authentication, which has been made upon validating the port, may be discarded when the port is invalidated.

As described above, according to the embodiments of the present invention, the authentication is made when two of the client module 11, the core module 12, and the components 13 to 15 execute a predetermined processing. This structure can prevent the multimedia processing apparatus from being operated by using the replaced unit or falsified unit. Consequently, the confidentiality can be enhanced more.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A multimedia processing apparatus comprising:
one or more first module configured to realize a function involved with a multimedia processing;
a second module configured to manage the one or more first module; and
a third module configured to control the one or more first module or to perform a state transition of the one or more first module through the second module, wherein
one of two modules out of the one or more first module, the second and the third modules holds a certificate that provides its personal identification,
when a first processing is executed between the two modules, the other one of the two modules authenticates the one of the two modules by using the certificate held by the one module, and then, the two modules start the first processing, and
the other one of the two modules discards the authentication involved with the one of the two modules, when executing a second processing, the first processing and the second processing being configured to be processed as a pair.

2. The multimedia processing apparatus according to claim 1, wherein
the other one of the two modules holds a certificate that provides its personal identification, and
when the first processing is executed between the two modules, the one of the two modules further authenticates the other one of the two modules by using the certificate held by the other one of the two modules, and after the one of the two modules and the other one of the two modules complete the authentication, the two modules start the first processing.

3. The multimedia processing apparatus according to claim 1, wherein
the other one of the two modules holds a certificate revocation list, and validates the certificate held by the one of the two modules, and
when the certificate is not written on the certificate revocation list, and the other one of the two modules succeeds in validating the certificate, the other one of the two modules determines that the authentication is successful, while, when the certificate is written on the certificate revocation list, or the other one of the two modules fails in validating the certificate, the other one of the two modules determines that the authentication is unsuccessful.

4. The multimedia processing apparatus according to claim 2, wherein
the two modules respectively hold a certificate revocation list,
the one of the two modules validates the certificate held by the other one of the two modules, and
when the certificate held by the other one of the two modules is not written on the certificate revocation list held by the one of the two modules, and the one of the two modules succeeds in validating the certificate held by the other one of the two modules, the one of the two modules determines that the authentication is successful.

5. The multimedia processing apparatus according to claim 2, wherein
the two modules discard the authentication between the two modules, when they execute a second processing that is processed as a pair with the first processing.

6. The multimedia processing apparatus according to claim 1, wherein
the one or more first module comprise a plurality of first modules,
both of the two modules are first modules,
the two modules are connected in a tunneled manner to each other, and
the apparatus further includes a buffer for communication between two tunneled first modules, wherein
the first processing is a processing of starting to use the buffer.

7. The multimedia processing apparatus according to claim 1, wherein
the one of the two modules is the one out of the one or more first module,
the other one of the two modules is the second module,
the first processing is a processing of creating an instance of the one of the two modules, and
the second processing is a processing of destroying the instance.

8. The multimedia processing apparatus according to claim 1, wherein
the one of the two modules is one out of the one or more first module,
the other module one of the two modules is the second module,
the first processing is a processing of creating a descriptor of the one of the two modules, and
the second processing is a processing of destroying the descriptor.

9. The multimedia processing apparatus according to claim 1, wherein
the one of the two modules is the one out of the one or more first module, the other module one of the two modules is the second module, the first processing is a processing of securing a system resource of the one of the two modules, and the second processing is a processing of releasing the system resource.

10. The multimedia processing apparatus according to claim 1, wherein the one of the two modules is one out of the one or more first modules, the other module one of the two modules is the second module, the first processing is a processing of changing the state of the one of the two modules from a first state to a second state, and the second processing is a processing of changing the state of the one of the two modules from the second state to the first state.

11. The multimedia processing apparatus according to claim 1, wherein the one or more first modules comprises a plurality of first modules, both of the two modules are first modules, the first processing is a processing of starting a tunneled connection between the two module and the second processing is a processing of disconnecting the tunneled connection between the two modules.

12. The multimedia processing apparatus according to claim 1, wherein the one or more first modules comprises a plurality of first modules, both of the two modules are first modules, the first processing is a processing of validating a port that establishes a tunneled connection between the two modules, and the second processing is a processing of invalidating the port that establishes the tunneled connection between the two modules.

13. The multimedia processing apparatus according to claim 1, wherein the one or more first modules comprises a plurality of first modules, both of the two modules are first modules, the first processing is a processing of changing the state of the one of the two modules from a first state to a second state, and the second processing is a processing of changing the state of the one of the two modules from the second state to the first state.

14. The multimedia processing apparatus according to claim 1, wherein the one of the two modules is the third module, the other one of the two modules is one out of the one or more the first modules, the first processing is a processing of creating an instance of the other one of the two modules, and the second processing is a processing of destroying the instance.

15. The multimedia processing apparatus according to claim 1, wherein the one of the two modules is the third module, the other one of the two modules is one out of the one or more first modules, the first processing is a processing of creating a descriptor of the other one of the two modules, and the second processing is a processing of destroying the descriptor.

16. The multimedia processing apparatus according to claim 1, wherein the one of the two modules is the third module, the other one of the two modules is one out of the one or more first modules, the first processing is a processing of securing a system resource of the other one of the two modules, and the second processing is a processing of releasing the system resource.

17. The multimedia processing apparatus according to claim 1, wherein the one of the two modules is the third module, the other one of the two modules is one out of the one or more first modules, the first processing is a processing of changing the state of the other one of the two modules from a first state to a second state, and the second processing is a processing of changing the state of the one of the two modules from the second state to the first state.

18. The multimedia processing apparatus according to claim 1, wherein the two modules respectively hold a pair of a public key and a secret key based upon a public key cryptosystem, the certificate held by each of the two modules is involved with the public key held by the corresponding module, and the two modules execute the communication with a communication session based upon the public key cryptosystem after the success in authentication.

19. The multimedia processing apparatus according to claim 18, wherein the two modules establish a second communication session based upon a common key cryptosystem utilizing the first communication session based upon the public key cryptosystem.

* * * * *